Patented Sept. 12, 1939

2,173,055

UNITED STATES PATENT OFFICE

2,173,055

MONAZO DYES FOR CELLULOSE ESTERS AND ETHERS

Emmet F. Hitch, Wilmington, Del., and Donovan E. Kvalnes, Penns Grove, N. J., assignors to E. I. du Pont de Nemours & Company, Wilmington, Del., a corporation of Delaware No Drawing. Application June 11, 1938, Serial No. 213,212

8 Claims. (Cl. 260—198)

This invention relates to monazo dyes which are useful for dyeing cellulose esters and ethers, such as cellulose acetate silk, and especially to such dyes in which the coupling component is a secondary naphthylamine having a polyhydroxyalkyl group connected to the amino nitrogen. The polyhydroxy-alkyl group is one which has four to six carbon atoms and one less hydroxy groups than carbons.

Heretofore benzene-azo-bis-dihydroxyethylaniline in which benzene is substituted by nitro or amino and benzene-azo-bis-dihydroxypropylaniline were known as soluble dyes for acetate silk but when the hydroxy alkyl radicals of these compounds contained four hydroxy groups the affinity of the compounds for cellulose acetate was found to be unsatisfactory. Other dyes heretofore used for dyeing acetate silk were insoluble or so nearly insoluble in water that it was difficult to obtain dispersion of the dyes in the dyebath or to prepare them in a sufficiently finely divided state in conjunction with a dispersing agent so that even dyeings can be made. In printing and often with dyeings made with such insoluble dyes, the printings and dyeings were speckled. Neither the soluble nor the insoluble dyes used heretofore had as satisfactory discharge properties as were desired; and many of the soluble dyes have not given dyeings on cellulose acetate which had satisfactory fastness to light and washing. It was therefore desirable to provide new water soluble dyes for cellulose esters and ethers which have good exhaust, discharge and fastness properties and will give level dyeings and printings.

Monazo dyes have now been discovered with which heavy even dyeings of good fastness properties can be easily made on cellulose esters and ether fibres. Dyeings can be made with solutions of the dyes but for the heaviest dyeings a dispersion of the dye in the solution is desirable. The dyes of the invention are so easily and completely dispersible in the solutions of the dye that heavy dyeings and printings result in general without using special precautions to obtain dispersion of the dye or to avoid uneven and speckled results.

It is among the objects of the invention to provide new dyes which have good affinity for and good fastness properties on cellulose ester and ether materials. Another object of the invention is to provide monazo dyes which can be used in solution to give even dyeings and printings on cellulose ester and ether materials. Another object of the invention is to provide new monazo dyes for cellulose esters and ethers which are easily dispersible in solutions of the dye. Still other objects of the invention will be apparent from the following description.

The objects of the invention are attained in general by coupling a diazotizable primary aryl amine of the benzene or naphthalene series with an N-polyhydroxyalkyl naphthylamine in which the polyhydroxyalkyl group has four to six carbon atoms and one less hydroxy group than carbons.

The invention will be more fully set forth in the following more detailed description which includes examples that are given as illustrative embodiments of the invention and not as limitations thereof.

*Example 1.—Para-nitro aniline→N-sorbityl alpha naphthylamine*

138 parts of para-nitro aniline were suspended in 1000 parts of water and 290 parts of 31.5% hydrochloric acid. The mixture was cooled to 0–5° C. by adding ice and diazotized by adding 69 parts of sodium nitrite dissolved in 200 parts of water. The mixture was filtered. 317 parts of N-sorbityl alpha-naphthlyamine were dissolved in 2000 parts of water and 116 parts of 31.5% hydrochloric acid and cooled to 5° C. by the addition of ice. The filtered diazo solution was added to the latter mixture. Before isolating the dye the mixture was made slightly alkaline to Brilliant yellow paper by the addition of sodium hydroxide solution. The red solution of the dye in hot water dyes cellulose acetate a heavy red shade. The dye is represented by the formula

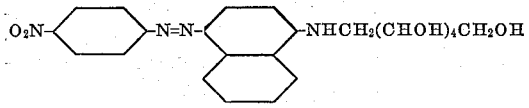

*Example 2.— 5-nitro-2-amino-anisole→N-mannityl 1,5-amino naphthol*

168 parts of 5-nitro-2-amino anisole were diazotized as described in Example 1. 333 parts of N-mannityl 1,5-amino naphthol (prepared by treating 1,5-amino naphthol with mannitol chlorhydrin) were dissolved in 2000 parts of water and 116 parts of 31.5% hydrochloric acid and cooled with ice to 5° C. The filtered diazo solution was added to the latter mixture. After stirring for some time to complete the coupling sufficient dilute sodium hydroxide solution was slowly added to make the reaction mixture neutral. The blue dye was isolated by filtration and dried. The product dyed cellulose acetate a heavy blue shade. The dye is represented by the formula

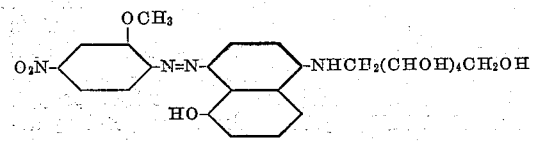

*Example 3.—Ortho-chlor-p-nitro aniline→N-sorbityl 1,5-amino naphthol*

173 parts of ortho-chlor-p-nitro aniline were diazotized in the usual manner as in Example 1, and added slowly to an ice cold, dilute acid solution of 333 parts N-sorbityl 1,5-amino naphthol. The N-sorbityl 1,5-amino naphthol was prepared by condensing 1,5-amino naphthol with glucose and catalytically reducing. Coupling occurred rapidly in strong acid solution. Sufficient sodium hydroxide solution was added to make the solution neutral and the dye was filtered off and washed. The blue dye was readily dispersed by known methods and dyed cellulose acetate a bright blue shade which was readily dischargeable. The dye is represented by the formula

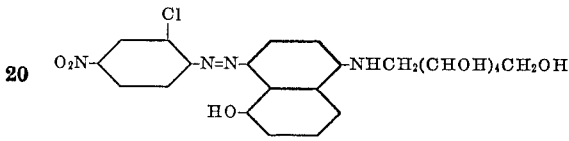

The following monazo dyes have been prepared by methods similar to those described in the foregoing examples. In the following examples the arrows indicate coupling and point from the aniline or naphthylamine which is diazotized. The colors indicate the color of the dyeings on acetate silk. Except as noted the properties of the dyeings were in general like the dyeings of Examples 1 to 3.

| Example | | |
|---|---|---|
| 4 | 2,5-dichlor aniline——→N-sorbityl alpha naphthylamine. | Orange. |
| 5 | 5-nitro-2-amino anisole——→N-sorbityl alpha naphthylamine. | Bluish red. |
| 6 | 2,4-dinitro aniline——→N-sorbityl alpha naphthylamine. | Violet. |
| 7 | 5-nitro-2-amino anisole——→N-sorbityl 1,5-amino naphthol. | Reddish blue. |
| 8 | 2,4-dinitro aniline——→N-sorbityl 1,5-amino naphthol. | Greenish blue. |
| 9 | 6-brom-2,4-dinitro aniline——→N-sorbityl 1,5-amino naphthol. | Do. |
| 10 | 6-brom-2,4-dinitro aniline——→N-sorbityl alpha naphthylamine. | Blue. |
| 11 | 4-nitro-1-naphthylamine——→N-sorbityl alpha naphthylamine. | Violet. |

The compounds of the invention are not restricted to those mentioned in the foregoing examples. The compounds are represented generally by the formula

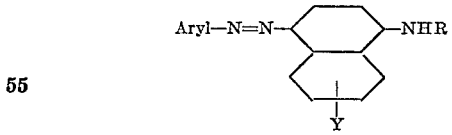

in which Aryl is the nucleus of a compound of the benzene or naphthalene series and may be unsubstituted or substituted once or more by other groups, except carboxyl and sulfonic acid, NHR is a secondary polyhydroxyalkyl amine radical in which R is a polyhydroxyalkyl group having four to six carbons and one less hydroxy group than carbons. Either or both aryl nuclei may be unsubstituted or they may be substituted by one or more substituents.

Among the substituents of Aryl are nitro, halogen, alkyl, alkoxy, acylamino, trifluoromethyl, hydroxy, the group —COOZ in which Z is alkyl or hydroxyalkyl, the group —CH$_2$NZ$_2$ where Z is alkyl or hydroxyalkyl, the group —SO$_2$Z where Z is alkyl, aryl, aralkyl or benzyl, and —CO alkyl, such as chloro, bromo, methyl, ethyl, propyl, longer chain alkyl groups, the corresponding alkoxy groups, acetylamino, longer chain alkacylamino groups, aroylamino groups, such as benzoylamino, the groups —COOCH$_2$(CHOH)CH$_2$OH, CH$_3$CO—  CH$_2$N(C$_2$H$_5$)$_2$ and —SO$_2$C$_6$H$_5$. The preferred diazo bases are para-nitro-anilines which may or may not be substituted by other groups.

As many substituent groups as one less than the number of carbons in Aryl may be present. Desirable variations can usually be obtained with no more than three substituent groups, but one or two substituent groups which are alike or unlike are highly satisfactory. Numerous diazo bases are specified in the examples but many others can be used.

The naphthalene nucleus of the coupling component may be unsubstituted or substituted by one or more groups up to two less than the number of carbons in naphthalene so long as the substituent groups do not interfere with the coupling with the diazotized aryl amines. Satisfactory variations can ordinarily be obtained with one to three substituents which may be alike or unlike and may be present in any unoccupied position of the naphthalene nucleus. As representative substituents are mentioned halogen, hydroxy, alkyl, alkoxy, amino, acylamino, and substituted amino groups, such as methyl, ethyl, propyl, the corresponding alkoxy groups, acetylamino, benzoylamino, —NHR groups in which R is alkyl or short chain hydroxyalkyl, and NR$_2$ groups in which the R's are alike or unlike and are alkyl or short chain hydroxyalkyl.

The symbol R stands for a polyhydroxy alkyl group having four to six carbon atoms and one less hydroxy group than carbons. The polyhydroxy alkyl group may be connected to the amino nitrogen through the carbon of an end group such as a —CH$_2$ group or a —CHOH group, or through the carbon of an intermediate group such as a —CH group. Types of polyhydroxy alkyl groups are —CH$_2$(CHOH)$_n$—CH$_2$OH,

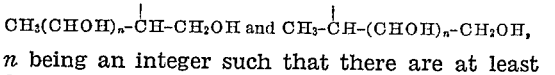

$n$ being an integer such that there are at least four carbons in the group. As examples of polyhydroxy alkyl groups are mentioned the radical of the alcohol sorbitol and the radical of reduced monosaccharides, such as erythrose, glucose, arabinose and still other radicals of monosaccharides having the required number of carbon and hydroxy radicals. It is to be understood that the radicals of other compounds besides those specifically mentioned can be used, such as the radical of pentaerythrytol, C(CH$_2$OH)$_4$.

Secondary arylamines suitable for coupling components can be made by various methods. For example, a secondary arylamine may be formed by catalytically hydrogenating a solution containing a polyhydroxy alkyl compound having the desired polyhydroxy radical and a substituted or unsubstituted primary aryl amine having an open position such that coupling can be made eventually to a diazotized aryl amine, the hydrogenation being carried out in the presence of a metallic hydrogenation catalyst, such as nickel or cobalt and at elevated temperatures and pressures, such as at 100° C. and 800 pounds pressure. The secondary amine can also be prepared by reacting a suitable halohydrin and the primary aryl amine by methods well known to the art, such as reacting a primary aryl amine and mannitol chlorhydrin, or a primary aryl amine and the chlorhydrin of pentaerythritol.

In general, good absorption of the dyes of the invention is obtained at about 85° C. but higher and lower temperatures can be used. For satisfactory results the same temperatures used for insoluble dyes may be used, namely about 75° C. to about 90° C. At the optimum temperatures the rate of absorption of the dyes of the invention is more rapid than dispersed insoluble dyes, strong dyeings are easier to make and stronger dyeings are obtained at relatively low temperatures than are obtained with insoluble dyes. For example, a skein of cellulose acetate silk was dyed as follows:

One part of the dye o-chlor-p-nitro aniline →N-sorbityl-1.5-amino naphthol was treated with one part of a dispersing agent, such as soap, and hot water and made up to a volume of 2000 parts. The temperature was raised to 75° C. and 50 parts of cellulose acetate silk were entered and dyed in the usual manner by keeping the dye bath at a temperature between 85° C. and 90° C. for forty-five minutes to one hour. The cellulose acetate was withdrawn from the dye bath, washed well and dried. The silk was dyed an attractive blue shade which had good fastness properties.

The dyes of the invention give level dyeings of unusual deep shade and of excellent fastness to light and washing on cellulose esters and ethers. They are relatively soluble and can be easily dispersed in their water solutions, giving even dyeings and prints. They have good affinity for cellulose esters and ethers, yield deep shades and have good fastness properties.

Since from the foregoing description of the invention it will be apparent to those skilled in the art that various other embodiments of the invention may be made without departing from the spirit and scope thereof, it is to be understood that the invention is not restricted to the illustrative embodiments which are specifically set forth.

I claim:

1. As a dye for cellulose ester and ether materials a compound represented by the formula

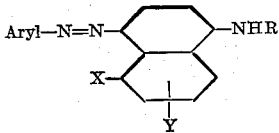

in which aryl is a radical of the group consisting of primary amines of the benzene and naphthalene series which are devoid of carboxyl and sulfonic acid groups, X is one of the group consisting of hydrogen and hydroxy, Y is at least one of the group consisting of hydrogen, hydroxy, alkyl, alkoxy, halogen, amino, acetylamino, benzoylamino, —NH alkyl, —NH hydroxyalkyl, dialkylamine and dihydroxyalkylamine, wherein the alkyl groups have one to three carbons, and R is a polyhydroxyalkyl group having four to six carbons and one less hydroxy than carbons.

2. As a dye for cellulose ester and ether materials a compound represented by the formula

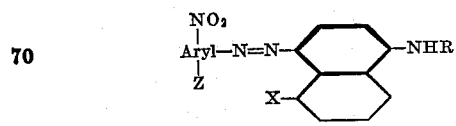

in which aryl is the residue of one of the group consisting of primary amino benzenes and primary amino naphthalenes, NO2 and the azo bridge are para to each other, Z is at least one of a group consisting of hydrogen, nitro, halogen and alkoxy, X is one of a group consisting of hydrogen and hydroxy, and R is a polyhydroxyalkyl group containing four to six carbons and one less hydroxy than carbons.

3. As a dye for cellulose ester and ether materials a compound represented by the formula

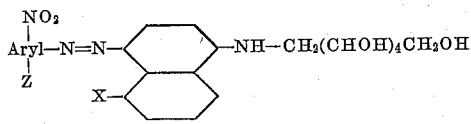

in which aryl is the residue of one of the group consisting of the nuclei of primary amino benzenes and the nuclei of primary amino naphthalenes, NO2 and the azo bridge are para to each other, Z is at least one of a group consisting of hydrogen, nitro, halogen and alkoxy, and X is one of a group consisting of hydrogen and hydroxy.

4. As a dye for cellulose ester and ether materials a compound represented by the formula

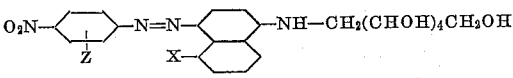

in which Z is at least one of a group consisting of hydrogen, nitro, halogen, and alkoxy, and X is one of a group consisting of hydrogen and hydroxy.

5. As a dye for cellulose ester and ether materials a compound represented by the formula

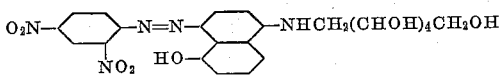

6. As a dye for cellulose ester and ether materials a compound represented by the formula

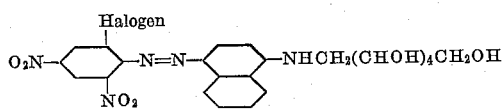

7. As a dye for cellulose ester and ether materials a compound represented by the formula

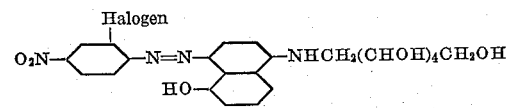

8. Process which comprises diazotizing a primary aryl amine of the benzene and naphthalene series which is devoid of carboxyl and sulfonic acid groups, and coupling in acidic medium with a compound represented by the formula

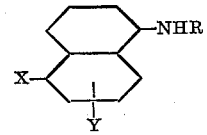

in which X is one of a group consisting of hydrogen and hydroxy, Y is at least one of a group consisting of hydrogen, hydroxy, alkyl, alkoxy, halogen, amino, acetylamino, benzoylamino, —NH alkyl, —NH hydroxyalkyl, dialkylamine and dihydroxyalkylamine, wherein the alkyl groups have one to three carbons, and R is a polyhydroxyalkyl group having four to six carbons and one less hydroxy than carbons.

EMMET F. HITCH.
DONOVAN E. KVALNES.